Patented Jan. 30, 1951

2,539,417

UNITED STATES PATENT OFFICE 2,539,417

PREPARATION OF CELLULOSE DERIVATIVE

Vernon R. Grassie, Wilmington, Del., assignor to Hercules Powder Company, Wilmington, Del., a corporation of Delaware No Drawing. Application June 18, 1948, Serial No. 33,923

8 Claims. (Cl. 260—231)

This invention relates to the preparation of carboxyethyl polysaccharide ethers and more particularly to the addition of esters of acrylic acid to cellulose whereby a carboxyethyl ether of cellulose is formed.

It is well known that the introduction of the carboxyethyl group into cellulose results in the production of water- and alkali-soluble derivatives of cellulose. These derivatives have many commercial applications and various attempts have been made to prepare carboxyethyl cellulose by a process which would be economically feasible on a commercial scale. Carboxyethyl cellulose has been prepared by reacting an alkali-cellulose with $\beta$-chloro- or $\beta$-bromo-propionic acid, hydrogen halide being formed as a by-product. Formation of the latter represents a considerable mass loss in the overall process and the halopropionic acids are not only expensive, but not readily available for commercial operations. Carboxyethyl cellulose has also been prepared by reacting alkali cellulose with acrylonitrile or acrylamide, followed by the hydrolysis of the nitrile or amide group in the resultant cyanoethyl or carbamylethyl cellulose, respectively. Each of these reactions has the disadvantage of requiring the conversion of the intermediate to the carboxyethyl cellulose and in each case this conversion is only partial, it being difficult to obtain a complete hydrolysis of all of the cyanoethyl or carbamyl-ethyl substituents.

Now in accordance with this invention it has been found that carboxyethyl polysaccharides, as, for example, carboxyethyl cellulose, may be prepared by reacting a suspension of an alkali polysaccharide in an inert solvent with an ester of acrylic acid. This new method of preparing these esters has the advantage over the prior art processes of utilizing readily available raw materials and, at the same time, being a very direct method of preparation. There is no intermediate product formed which must be hydrolyzed as in the case of the prior art processes, since, when the acrylate ester is added to the polysaccharide, the ester groups saponify to the carboxylic group under the conditions used in carrying out the reaction.

The following examples will illustrate the new process for preparing carboxyethyl polysaccharides in accordance with this invention. All parts and percentages are by weight unless otherwise indicated.

Example 1

Ten parts of cotton linters ground to 20-mesh size were suspended in 200 parts of dioxane. To this mixture were added 14.8 parts of sodium hydroxide pellets (2 molecular equivalents of hydroxide per cellulose hydroxyl) and sufficient water was then added to make up an 80% alkali solution with the sodium hydroxide. The mixture was boiled under reflux for 1 hour, cooled slightly and then transferred to a tumbling autoclave. Methyl acrylate, 31.8 parts (2 moles per cellulose hydroxyl), was then added to the dioxane suspension of alkali cellulose and the reaction mixture was heated for 4 hours at 140° C. with continuous agitation. The fibrous product was isolated by filtration, washed thoroughly with 80% methanol, then with commercial methanol (98–100%), and finally dried in vacuo at 60° C. The carboxyethyl cellulose, in the form of its sodium salt, so obtained was soluble in water and in dilute aqueous alkalies, yielding viscous solutions in each case.

Example 2

Ten parts of cotton linters ground to 20-mesh size were macerated with 38 parts of a 40% aqueous sodium hydroxide solution (2 molecular equivalents of sodium hydroxide per cellulose hydroxyl). After standing for 1 hour, the alkalicellulose crumbs were suspended in 160 parts of tert-butanol and the mixture was heated for 1 hour at the reflux temperature of the solvent. With the temperature at 80° C., 15.9 parts of methyl acrylate were added (1 mole per cellulose hydroxyl) and the reaction mixture was heated at 80° C. for 5 hours with constant agitation. The fibrous product was separated and purified by the methanol washing procedure described in Example 1. The carboxyethyl cellulose, in the form of its sodium salt, so prepared was soluble in water and in dilute aqueous alkalies, viscous solutions being formed in each case.

Example 3

Ten parts of purified wood pulp, ground to 20-mesh size, were suspended in 160 parts of isopropanol and 57.6 parts of a 24% aqueous solution of sodium hydroxide (1.87 molecular equivalents per cellulose hydroxyl) were added. The isopropanol suspension was heated for 1 hour at the boiling point of the solvent. With the temperature at 70° C., 21.2 parts of methyl acrylate (1.33 molecular equivalents per cellulose hydroxyl) were added and the reaction mixture was heated at 70° C. for 16 hours with constant agitation. The fibrous product was separated and purified by the methanol washing procedure described in Example 1. The carboxyethyl cellulose so prepared was soluble in water and in dilute aqueous alkalies, viscous solutions being formed in each case.

Example 4

Ten parts of purified wood pulp, ground to 20-mesh size, were suspended in 220 parts of isopropanol and 40.8 parts of a 24% aqueous sodium hydroxide (1.42 molecular equivalents per cellulose hydroxyl) were added. The isopropanol suspension was then agitated for 1½ hours at room temperature. The alkali-cellulose suspension was then treated with 11.4 parts of methyl acrylate (0.71 molecular equivalent per cellulose hydroxyl) and the reaction mixture was heated at 70° C. for 4 hours with constant agitation. The fibrous product was separated and purified by the methanol washing procedure described in Example 1. The carboxyethyl cellulose so obtained was soluble in water and in dilute aqueous alkalies.

Example 5

Ten parts of cellulose, regenerated from technical cellulose acetate by sodium methylate deacetylation, were suspended in 160 parts of tert-butanol. To this suspension were added 24.6 parts of a 36% aqueous solution of sodium hydroxide (1.19 molecular equivalents per cellulose hydroxyl) and the mixture was heated for 1 hour at 80° C. Methyl acrylate, 15.9 parts (1 mole per cellulose hydroxyl), was then added and the reaction mixture was heated at 80° C. for 5 hours with constant agitation. The carboxyethyl cellulose was separated and purified as described in Example 1 and found to be soluble in both water and dilute aqueous alkalies, yielding viscous solutions.

Example 6

Ten parts of cotton linters ground to 20-mesh size were suspended in 200 parts of dioxane and 24.6 parts of a 36% aqueous sodium hydroxide solution (1.19 molecular equivalents per cellulose hydroxyl) were added. The suspension was heated under reflux for 1 hour and then 18.5 parts of ethyl acrylate (1 molecular equivalent per cellulose hydroxyl) were added. The reaction mixture was then heated at 100° C. for 5 hours with constant agitation. The fibrous product was isolated and purified as described in Example 1. The carboxyethyl cellulose so obtained was soluble in water and dilute aqueous alkalies, yielding viscous solutions in each case.

Example 7

Example 6 was repeated except that the alkali cellulose was prepared from cotton linters ground to 40-mesh size and 23.7 parts of n-butlyl acrylate (1 molecular equivalent per cellulose hydroxyl) were substituted for the ethyl acrylate used in that example, and the reaction mixture was heated for 4 hours at 100° C. The carboxyethyl cellulose so prepared was soluble in water and in dilute aqueous alkalies, yielding viscous solutions in each case.

Example 8

Example 7 was repeated except that 2-ethylhexyl acrylate (36 parts, which was 1 molecular equivalent per cellulose hydroxyl) was substituted for the n-butyl acrylate used in that example. The carboxyethyl cellulose so prepared was soluble in water and in dilute aqueous aklalies, yielding viscous solutions in each case.

Example 9

Ten parts of cotton linters ground to 40-mesh size were suspended in 200 parts of dioxane and 28.2 parts of a 44% aqueous solution of potassium hydroxide (1.19 molecular equivalents per cellulose hydroxyl) were added. The suspension was heated under reflux for 1 hour after which 23.7 parts of n-butyl acrylate (1 molecular equivalent per cellulose hydroxyl) were added. The reaction mixture was then heated for 20 hours at 100° C. with constant agitation. The fibrous product was isolated as described in Example 1 and the carboxyethyl cellulose so prepared was found to be soluble in water and in dilute aqueous alkalies, yielding viscous solutions in each case.

Example 10

Ten parts of cotton linters ground to 40-mesh size were treated with 40 parts of a 40% aqueous solution of trimethyl benzyl ammonium hydroxide and the mass was thoroughly macerated and then allowed to stand for 24 hours at room temperature. The alkali cellulose so prepared was then suspended in 150 parts of dioxane and 21.2 parts of methyl acrylate (1.33 moles per cellulose hydroxyl) were added. The reaction mixture was then heated at 90°–100° C. for 4 hours. The fibrous product was isolated and purified as described in Example 1. The carboxyethyl cellulose so prepared was found to be soluble in dilute aqueous alkali.

In accordance with this invention carboxyethyl ethers of polysaccharides may be prepared by the addition of an ester of acrylic acid to the polysaccharide in an organic solvent medium and in the presence of an alkaline reagent. This carboxyethylation reaction will proceed readily with any polysaccharide such as cellulose, or partially substituted cellulose, starch, cellodextrins, pectic substances, etc., and will impart water- and alkali-solubility to polysaccharides which, prior to carboxyethylation, do not possess these solubility characteristics.

It has been found that in order to carry out the carboxethylation reaction of an acrylate with the carbohydrate hydroxyls, an ester of acrylic acid should be used since neither the free acid nor the alkali salts thereof appear to react with the polysaccharide. Any ester of acrylic acid may be used to carry out the carboxyethylation reaction. Methyl acrylate is probably the one most available commercially, but, as may be seen from the foregoing examples, other esters of acrylic acid are equally effective as, for example, ethyl, propyl, isopropyl, butyl, isobutyl, amyl, hexyl, 2-ethylhexyl, benzyl, etc., acrylates may be used. Nearly all of the commercial acrylate esters contain small amounts of inhibitors such as hydroquinone, β-phenyl naphthylamine, etc., to prevent their polymerization. These inhibitors have no effect upon the reaction itself. However, they do tend to impart a light-grey or brown color to the carboxyethyl ether, and, if a light-colored product is desired, an inhibitor-free acrylate ester should be used. These inhibitors are readily removed by distillation of the acrylate ester.

The amount of acrylic acid ester to be added to the polysaccharide material is dependent upon the degree of etherification desired in the final product. Usually, to obtain a water- and alkali-soluble carboxyethyl ether of the polysaccharide from about 0.5 to about 2.0 molecular equivalents of the acrylate are added per etherifiable hydroxyl group in the polysaccharide. Larger amounts may be used if desired without any disadvantageous results. However, when lesser amounts are used, the final product may not be sufficiently etherified to produce the water- and alkali-soluble characteristics which are usually desired.

The reaction between the polysaccharide as, for example, cellulose and the acrylate ester takes place in the presence of an alkaline reagent. Any strongly alkaline hydroxide as, for example, the alkali metal hydroxides such as sodium hydroxide or potassium hydroxide, or the quaternary ammonium hydroxides such as trimethyl benzyl ammonium hydroxide, etc., may be used. The alkaline reagents are believed to serve two purposes in the carboxyethylation reaction; to swell and disperse the cellulose or other polysaccharide, thus activating it, and to catalyze the acrylate addition.

Any mode of introducing the alkaline reagent into the reaction mixture may be utilized. The cellulose or polysaccharide may be converted to an alkali cellulose by suspending the cellulose in an organic solvent and treating with an aqueous solution of from 20 to 80% concentration of the alkaline reagent. In this alkali cellulose preparation, the amount of alkaline reagent is adjusted to approximately 2 moles per etherifiable hydroxyl group, although the reaction proceeds favorably with higher proportions of alkali, and also with lesser amounts providing that proportionately lesser amounts of the acrylate ester are used in the subsequent etherification reaction. The mixture of cellulose, or cellulose derivative, or other polysaccharide, organic solvent and alkaline reagent may then be agitated and heated for 1 hour at 50° C. or above, or it may be simply agitated at room temperature. An alternative method of alkali-polysaccharide formation consists of pretreating the carbohydrate material with an aqueous alkaline reagent and then suspending the crumbs so formed in an organic solvent before the acrylate reaction. Substantially the same results are obtained by this procedure. It is also possible to add the alkaline reagent along with all of the other reactants, carrying out the reaction in one step. However, this method is disadvantageous in that the acrylic ester is more apt to be saponified before the reaction with the cellulose takes place and consequently a much lower degree of substitution would occur since the free acid or salt of the acrylic acid does not appear to undergo the reaction.

By alkali cellulose or other polysaccharide as used in this specification and appended claims is meant the alkali metal salt and ammonium salts as, for example, the quaternary ammonium salts of the carbohydrate.

As already pointed out above, the reaction between the alkali-cellulose, or other polysaccharide, and the acrylic acid ester is carried out in the presence of an organic solvent. Any inert organic solvent; i. e., any organic solvent having no tendency to react with the acrylate ester, may be used as the medium for the carboxyethylation procedure. Aqueous media do not appear to be operable, probably because they favor the saponification of the acrylate ester before the latter can react with the polysaccharide. The organic solvents are believed to hinder such saponification enough that the addition reaction readily occurs before the ester group is saponified. Among the solvents which may be used for the reaction are dioxane, isopropanol, tert-butanol, tetrahydrofuran, diethyl cellosolve, etc.

The polysaccharide may be suspended in the solvent before the treatment with the alkaline reagent, or the alkali cellulose may be prepared and then suspended in the solvent. The amount of solvent used is determined by the type of agitation available for the heterogeneous reaction, since mixing becomes increasingly difficult with increasing cellulose proportions, and also by the form of cellulose used; i. e., the state of subdivision. In general, with ground cotton linters a cellulose to solvent ratio of about 1:9 to about 1:20 is used and with unground linters a ratio of about 1:25 to about 1:50 is used.

The carboxyethylation reaction in accordance with this invention can take place at any convenient temperature. Usually, a temperature above about 50° C. is desirable and for atmospheric pressure reactions is limited in its upper range by the boiling point of the particular solvent being used. If it is desired to carry out the reaction at higher than boiling point temperatures, the reaction mixture may be heated with agitation in an autoclave. In carrying out the reaction, it is preferable to heat the suspension of alkali-cellulose in the solvent to the temperature desired for the reaction prior to the addition of the acrylate ester. When heated at temperatures of about 50° C. to about 140° C., the reaction is usually complete in about 2 to about 6 hours. Longer heating periods may be used, depending chiefly upon the temperature of the reaction and the size of the batch, but care should be taken to avoid de-etherification and depolymerization of the product.

It might be expected that the product obtained by carrying out the reaction in accordance with this invention would be in the form of the ester of the carboxyethyl ether of the cellulose or other polysaccharide. However, this is not the case and the product obtained is the carboxyethyl ether of the polysaccharide in the form of its salt. Referring to the reaction with cellulose as typical, the reaction may be represented as follows:

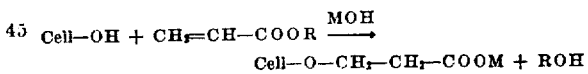

$$\text{Cell—OH} + \text{CH}_2\text{=CH—COOR} \xrightarrow{\text{MOH}} \text{Cell—O—CH}_2\text{—CH}_2\text{—COOM} + \text{ROH}$$

where Cell—OH represents an etherifiable hydroxyl group of cellulose, R is an organic radical and MOH is the strongly alkaline hydroxide. Thus, it may be seen that the ethylenic addition and saponification of the ester group appear to take place simultaneously. Whether these two reactions actually occur simultaneously or whether they take place as two separate but rapidly succeeding reactions is not known. No intermediate ester of the carboxyethyl ether has been isolated, the product in every case being the alkali salt of the ether.

The carboxyethyl ether of the polysaccharide, in the form of its alkali salt, may readily be isolated from the reaction mixture by filtration since it is in the same physical state as the original polysaccharide and is insoluble in the organic solvent medium. For example, when fibrous cellulose is converted to its carboxyethyl ether by this reaction, the product will likewise be fibrous. The carboxyethyl ether is thus not only in a very desirable form but being in this form is very easily purified by a simple washing procedure. The solvent used for this washing operation should be one which will readily dissolve the unreacted alkali acrylate and hydroxide but which will not at the same time dissolve the carboxyethyl ether. A convenient solvent for this purpose is methanol. Since methanol itself will dissolve an alkali hydroxide but not an alkali acrylate, a methanol-water mixture should be used for the washing operation. An 80% methanol has been found to be effective for this purpose. However, other solvents are equally operable. After removal of the unreacted constituents and by-products, the carboxyethyl ether may be dried in the form of its alkali salt, or, should the free acid form be desired, it may be acidified and isolated.

The carboxyethyl ethers of polysaccharides prepared in accordance with this invention have widespread applications. For example, carboxyethyl cellulose prepared as described herein may be used as a thickening agent in textile printing pastes, latex dispersions, etc., in an oil drilling mud, as a creaming agent for latex, in special purpose adhesives, and in many other important applications.

What I claim and desire to protect by Letters Patent is:

1. The process of preparing a carboxyethyl cellulose ether which comprises heating a suspension of the cellulose in an inert organic solvent with an alkyl ester of acrylic acid in the presence of an aqueous solution of a strongly basic hydroxide, to a temperature of at least 50° C.

2. The process of preparing a carboxyethyl cellulose ether which comprises heating a suspension of an alkali cellulose in an inert organic solvent with an alkyl ester of acrylic acid, to a temperature of at least 50° C.

3. The process of preparing a carboxyethyl cellulose ether which comprises heating cellulose with an aqueous solution of a strongly basic hydroxide and then reacting a suspension of the alkali cellulose in an inert organic solvent with an alkyl ester of acrylic acid, to a temperature of at least 50° C.

4. The process of preparing a carboxyethyl cellulose ether which comprises heating a suspension of an alkali cellulose in an inert organic solvent with an alkyl acrylate to a temperature of at least 50° C.

5. The process of preparing a carboxyethyl cellulose ether which comprises reacting cellulose with an aqueous solution of a strongly basic hydroxide and then heating a suspension of the alkali cellulose in an inert organic solvent with an alkyl acrylate to a temperature of at least 50° C.

6. The process of preparing a carboxyethyl cellulose ether which comprises reacting cellulose with an aqueous solution of a strongly basic hydroxide and then heating a suspension of the alkali cellulose in an inert organic solent with a methyl acrylate to a temperature of at least 50° C.

7. The process of preparing a carboxyethyl cellulose ether which comprises heating a suspension of an alkali cellulose in an inert organic solvent with at least 0.5 mole of methyl acrylate per cellulose hydroxyl to a temperature of at least 50° C.

8. The process of preparing a carboxyethyl cellulose ether which comprises reacting cellulose with an aqueous solution of a strongly basic hydroxide and then heating a suspension of the alkali cellulose in an inert organic solvent with at least 0.5 mole of methyl acrylate per cellulose hydroxyl to a temperature of at least 50° C.

VERNON R. GRASSIE.

REFERENCES CITED

The following references are of record in the file of this patent:

UNITED STATES PATENTS

| Number | Name | Date |
|---|---|---|
| 2,332,048 | Bock et al. | Oct. 19, 1943 |
| 2,332,049 | Bock et al. | Oct. 19, 1943 |
| 2,349,797 | Bock et al. | May 30, 1944 |

FOREIGN PATENTS

| Number | Country | Date |
|---|---|---|
| 562,581 | Great Britain | July 7, 1944 |
| 562,584 | Great Britain | July 7, 1944 |

OTHER REFERENCES

Rehberg et al., J. A. C. S., April 1946, vol. 68, pp. 544–6.